Nov. 26, 1968 D. F. SHEAHAN 3,413,576

GYRATOR ISOLATION CIRCUIT HAVING NEGATIVE FEEDBACK CIRCUIT TO MAINTAIN VOLTAGE ACROSS GYRATOR SUBSTANTIALLY CONSTANT

Filed Dec. 22, 1966 2 Sheets-Sheet 1

INVENTOR.
DESMOND F. SHEAHAN

BY

ATTY.

Nov. 26, 1968 D. F. SHEAHAN 3,413,576

GYRATOR ISOLATION CIRCUIT HAVING NEGATIVE FEEDBACK CIRCUIT TO MAINTAIN VOLTAGE ACROSS GYRATOR SUBSTANTIALLY CONSTANT

Filed Dec. 22, 1966

2 Sheets-Sheet 2

United States Patent Office 3,413,576

Patented Nov. 26, 1968

3,413,576

GYRATOR ISOLATION CIRCUIT HAVING NEGATIVE FEEDBACK CIRCUIT TO MAINTAIN VOLTAGE ACROSS GYRATOR SUBSTANTIALLY CONSTANT

Desmond F. Sheahan, Redwood City, Calif., assignor to Automatic Electric Laboratories, Inc., a corporation of Delaware

Filed Dec. 22, 1966, Ser. No. 603,977
7 Claims. (Cl. 333—80)

ABSTRACT OF THE DISCLOSURE

An electrical circuit isolates a gyrator circuit from the terminals of its bias supply thereby permitting the simulation of a "floating" inductor for use as a series circuit element in a filter circuit. The isolation circuit provides high impedance paths between the gyrator bias terminals and the voltage source terminals and a feedback path for stabilizing the bias conditions of the gyrator.

BACKGROUND OF THE INVENTION

This invention relates to electrical circuits and more particularly to an electrical circuit for coupling a gyrator circuit to its bias supply.

In electrical circuits, it is frequently a requirement that a circuit load be isolated from the circuit bias source. In some cases, it is possible to ground one terminal of the load so that it is only necessary to isolate one load terminal, however, it is often necessary that both terminals be isolated. One such case exists in the design of transistorized gyrators which are used to simulate "series" inductors for use in solid-state filter circuits because the requirement of a grounded terminal for the simulated inductor would complicate the design and construction of such circuits.

A technique for realizing an ungrounded gyrator has previously been proposed in the literature by A. Holt and J. Taylor in Electronics Letters, vol. 1, No. 4, June 1965, p. 105. This method requires two gyrators to simulate an inductor, and it is necessary that the four gyrator conductances of the two gyrators be matched exactly in order to prevent the appearance of shunt inductances between the terminals of the "simulated" inductor and ground.

SUMMARY OF THE INVENTION

Accordingly, this invention provided an ungrounded gyrator which provides a simulated inductor which is as stable as the simulated inductor which would be obtained by using the same gyrator if grounded. Furthermore, the gyrator as provided by this invention does not exhibit shunt elements to ground on the terminals of the simulated inductor which are dependent on matching of gyration conductances.

The ungrounded gyrator has its bias terminals coupled through the high impedances presented by two constant current sources so that the gyrator is effectively "floating" with respect to the bias supply terminals. A negative feedback circuit is connected between the gyrator and one of the current sources to vary the resistance of the current source inversely with the current requirements of the gyrator so that the voltage across the gyrator is maintained at a substantially constant level. Consequently, the gyrator appears to obtain its bias from a constant voltage source.

BRIEF DESCRIPTION OF THE DRAWINGS

The operation of the gyrator isolation circuit according to the present invention will be better understood with reference to the following detailed description and the accompanying drawings in which.

DESCRIPTION OF THE PREFERRED EMBODIMENT

Figure 1:
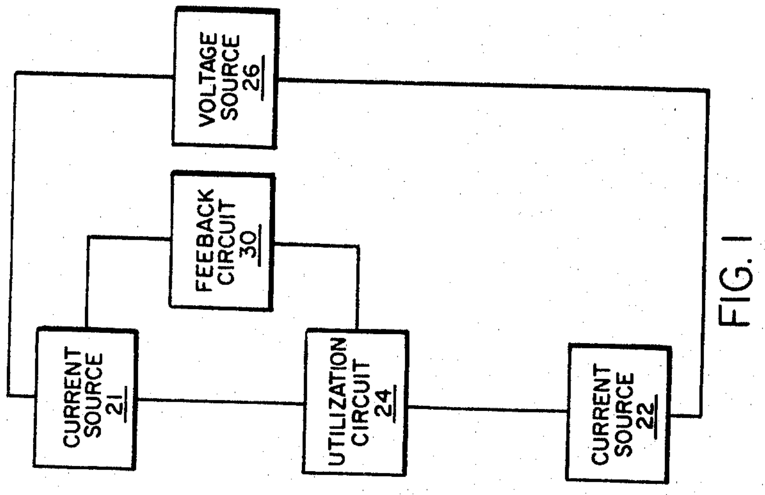
FIG. 1 is a block diagram of the isolation circuit.

Referring to FIG. 1, there is illustrated in block form an electrical isolation circuit in accordance with this invention. A utilization circuit 24 is coupled to a voltage source 26 by two constant current sources 21, 22. The D.C. bias conditions of this system are stabilized by a feedback circuit 30 which senses voltage changes at the junction of the utilization circuit 24 and the current source 21 which may occur due to variations in the load impedance and automatically increases or decreases the current output of this source to compensate for this variation in load impedance.

Figure 2:
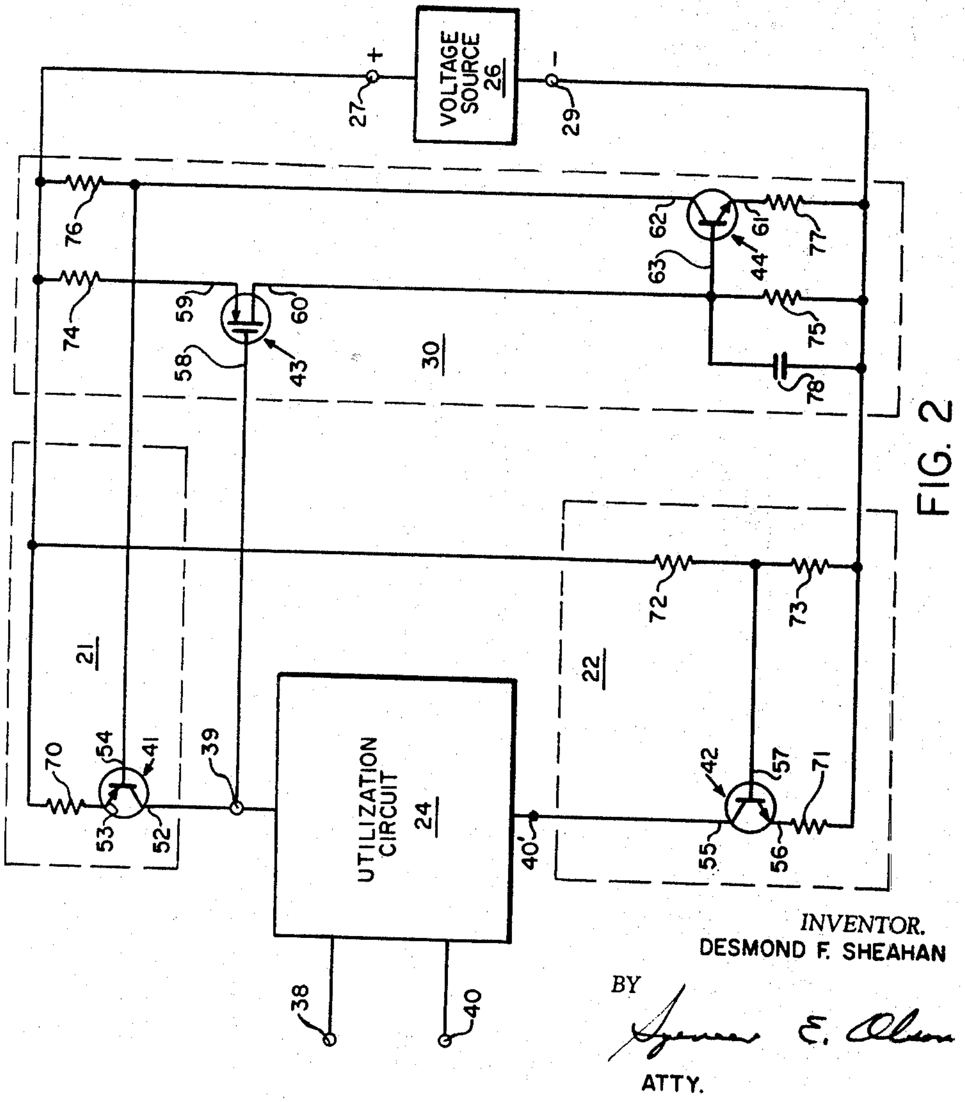
FIG. 2 is a circuit diagram of the isolation circuit shown connected to a utilization circuit.

A detailed circuit schematic is given in FIG. 2. The utilization circuit 24 has an input terminal 38, a bias terminal 39, and a common terminal 40 and is isolated from both the positive and the negative terminals of the voltage source 26 through the high impedances of constant current sources 21, 22. The terminals 38 and 40 are utilization terminals for the circuit while terminals 39 and 40′, the latter being common with terminal 40, are connected to a source of bias for the utilization circuit.

Current source 21 includes a PNP transistor 41 having a collector 52, an emitter 53, and a base 54. Current source 22 includes an NPN transistor 42 having a collector 55, an emitter 56, and a base 57. The collector 52 of transistor 41 is connected to the bias terminal 39 of the utilization circuit 24 and collector 55 of transistor 42 is connected to the common lead 40′ of the utilization circuit. The emitter 53 of transistor 41 is connected through a resistor 70 to the positive terminal 27 of the voltage source 26. Similarly, the emitter 56 of transistor 42 is connected, through a resistor 71, to the negative terminal 29 of the voltage source.

Resistors 72, 73 are connected in series across the voltage source 26. The base 57 of transistor 42 is connected to the junction of these two resistors 72, 73 so that the base 57 is maintained at a predetermined bias level and receives a substantially constant current. Thus, the bias for transistor 42 is fixed through resistors 71, 72 and 73.

The bias for transistor 41 of current source 21 is controlled by the feedback circuit 30 which comprises two series circuits coupled across the voltage source 26. One of the circuits includes resistors 74, 75 and a voltage sensitive device 43 which may be a metal-oxide semiconductor field-effect transistor (hereinafter abbreviated MOSFET). The MOSFET has a gate 58, a source 59, and a drain 60. The source 59 is connected to the positive terminal 27 of the volatge source 26 through a resistor 74 and the drain 60 of the MOSFET is connected to the negative terminal of voltage source through a resistor 75. The "source-drain" current path of the MOSFET and resistor 75 are in series. Resistor 75 is shunted by a capacitor 78 which shorts A.C. signals to the ground reference of the feedback circuit, the negative terminal 29 of the voltage source, so that the feedback circuit is effectively decoupled from A.C. signals. The A.C. decoupling is effective for frequencies higher than the cutoff frequencies of the decoupling circuit. Thus, the feedback is effective at D.C. and stabilizes the bias conditions, but is decoupled for A.C.

The gate 58 of the MOSFET is connected to the bias terminal 39 of the utilization circuit 24 so that any changes in voltage occurring at this terminal are sensed by the detector, the MOSFET 43, in the feedback circuit.

The other series circuit includes resistors 76, 77 and a second voltage sensing device 44 which may be an NPN transistor having an emitter 61, a collector 62, and a base 63. The transistor 44 has its emitter 61 connected to the negative terminal 29 of the voltage source 26 through resistor 77 and its collector 62 connected to the positive terminal 27 of the voltage source through resistor 76. Resistor 76 and the "collector-emitter" current path of transistor 44 are in series so that a current passing through the transistor also passes through resistor 76. The base 54 of transistor 41 is connected to the junction of the collector 62 of transistor 44 and resistor 76.

The feedback circuit operates in the following manner. Assuming that there is a decrease in the impedance of the utilization circuit, there would be a corresponding decrease in the voltage level at bias terminal 39. This change would be detected by the MOSFET 43. The current in the "source-drain" circuit is inversely proportional to the voltage at the gate 58 of the MOSFET, so that the current flowing through the MOSFET, and hence, the current flowing through resistor 75, would increase. When this current increases, the voltage drop across resistor 75 would also increase and the base-emitter voltage on transistor 44 will increase thereby making the base 63 less negative with respect to the emitter 61. This will, in turn, increase the amount of current flowing through the transistor 44 and the voltage drop across resistor 76 will increase. As a result, the emitter-base voltage on transistor 41 would be increased thereby increasing the amount of current flowing from transistor 41 and correcting for the initial voltage decrease at the collector 52 of transistor 41.

A similar feedback action is produced if the voltage at terminal 39 of the utilization circuit increases rather than decreases.

As has been pointed out above, this isolation circuit can be used to convert a grounded gyrator into a "floating" one so that an originally grounded gyrator can be converted for use as a series element in a filter circuit. One example of a grounded gyrator which may be converted to an ungrounded gyrator is shown in U.S. patent application Ser. No. 598,792, filed Dec. 2, 1966 by H. Orchard and the applicant.

Figure 3:
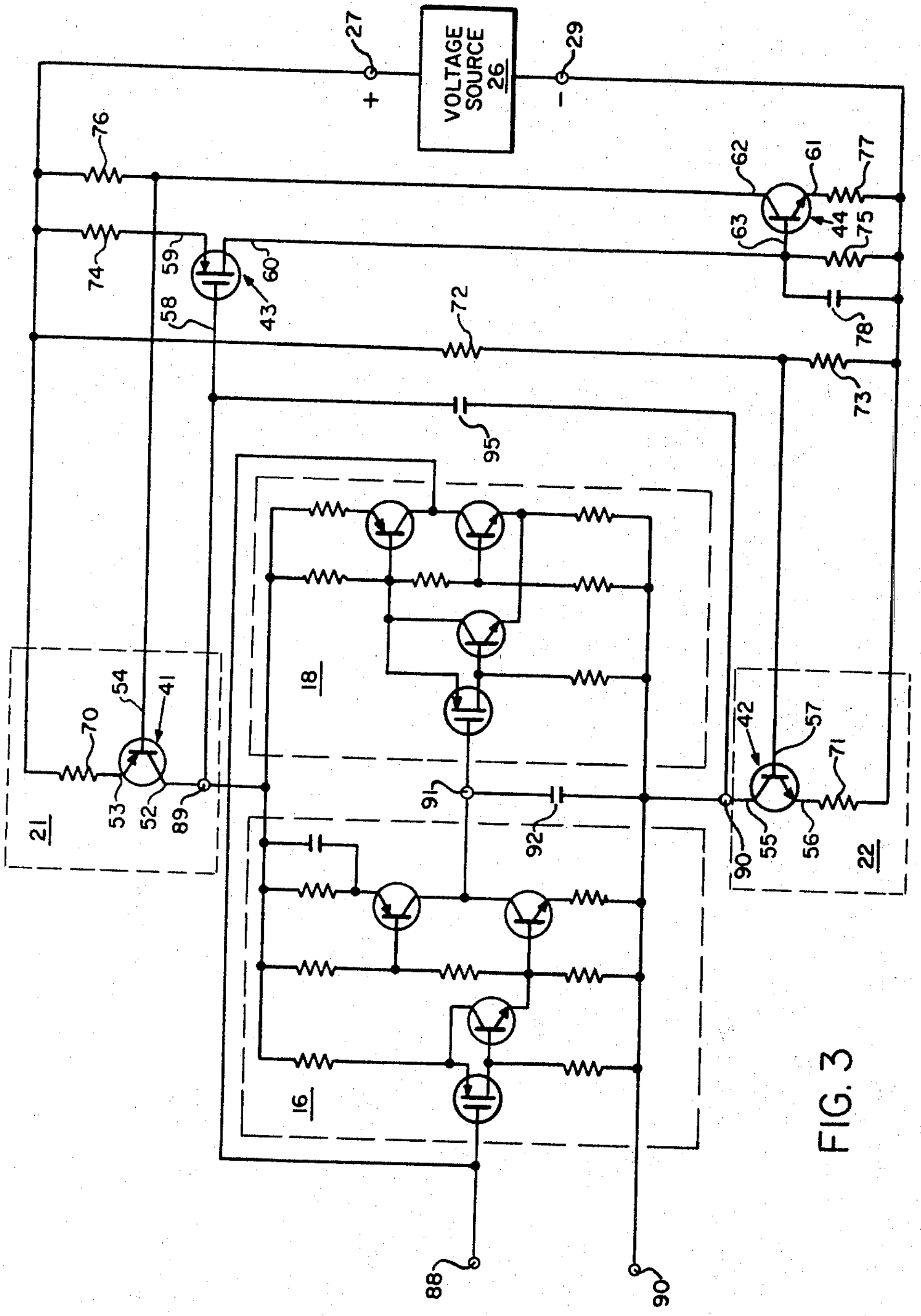
FIG. 3 is a circuit diagram of the isolation circuit shown connected to a gyrator circuit according to a preferred embodiment.

The gyrator, shown in FIG. 3, comprises two voltage-controlled current amplifiers 16 and 18 connected in a closed loop. Amplifier 16 has a zero degree phase shift from its input to its output and amplifier 18 has a 180° phase shift from its input to its output. The amplifiers are D.C. coupled throughout to permit the flow of D.C. stabilizing currents. The output of amplifier 16 and the input of amplifier 18 are connected to terminals 90 and 91 which form the gyrator output port. Similarly, the output of amplifier 18 and the input of amplifier 16 are connected to terminals 88 and 90 which form the gyrator input port. When a capacitor is connected to the gyrator output port, the gyrator simulates an inductor when viewed from its input port. The value of the inductance which can be simulated is determined by the value of capacitance connected to the output port.

To obtain a floating inductor, the gyrator is connected as shown in FIG. 3, between the two current sources 21, 22. From a D.C. point of view, the gyrator is fed with a constant D.C. current with the magnitude of this current being determined by the values of resistors 70, 71. The values of resistors 70, 71 are chosen so that the gyrator has the same voltage across terminals 89 and 90 and draws the same current as if it were being fed from a conventional constant voltage source connected across terminals 89 and 90. A capacitor 95 is connected between the bias terminals 89 and 90 of the gyrator to provide the same low impedance between the bias terminals 89 and 90 of the gyrator as would be provided by a constant voltage source.

Although the collector impedances of transistors 41 and 42 of the constant current sources appear in shunt across the terminals of the inductor the impedances are of such a high magnitude that they will not create loading problems.

The gyrator output terminals 90 and 91 are loaded with a capacitor 92 so that an inductive impedance is presented as viewed from the input terminals 88 and 90 of the gyrator, and the inductor simulated is "floating" with respect to both the positive and the negative terminals of the voltage source.

Thus, it can be seen that applicant has provided an electrical circuit using two constant current sources to isolate a utilization circuit, which may be a gyrator circuit, from the positive and negative terminals of a voltage bias source. The electrical circuit includes a feedback circuit to stabilize the D.C. bias conditions of the gyrator. A simulated inductor thus obtained, which although ungrounded, is as stable as the inductor obtained by using the original grounded gyrator.

While the invention has been described in a preferred application and with reference to a preferred embodiment, applicant does not intend to limit the scope of the invention to this particular application because there are other applications where the utilization circuit may not be a gyrator, but may be, for instance, some other active network or a passive network comprising a single element or a plurality of elements. Such a circuit obviously could be isolated through the use of the circuit according to this application. Furthermore, there are certain modifications of the preferred embodiment which may be possible without departing from the scope of this invention.

What is claimed is:

1. An electrical circuit for coupling a utilization circuit having first and second terminals to a voltage source having first and second terminals; said electrical circuit comprising:

first and second transistors of complementary types and each having emitter, base and collector electrodes;

the emitter and collector electrodes of said first transistor being connected between the first terminal of said source and the first terminal of said utilization circuit, respectively;

the emitter and collector electrodes of said second transistor being connected between the second terminal of said source and the second terminal of said utilization circuit, respectively;

means supplying to the base electrode of said second transistor a substantially constant current; and a negative feedback circuit interposed between the collector and the base electrodes of said first transistor, said negative feedback circuit comprising means, including a voltage sensitive device having a control electrode connected to the collector electrode of said first transistor and hence to said first terminal of the utilization circuit, and having output electrodes, direct-currentwise, substantially isolated from said control electrode, for supplying to the base electrode of said first transistor a current controlled by current traversing the output electrodes of, and varying inversely with voltage changes sensed by the control electrode of said device.

2. An electrical circuit as claimed in claim 1, which further includes an impedance and wherein said voltage sensitive device is a field-effect transistor having one of its output electrodes connected to said impedance whereby the current traversing the output electrodes of said field-effect transistor effects corresponding voltage changes across said impedance.

3. An electrical circuit as claimed in claim 2, wherein said negative feedback circuit further includes a fourth transistor having an input electrode, an output electrode, and a common electrode, the input electrode of said fourth transistor being connected to the junction of said one output electrode of said field-effect transistor and said impedance for sensing voltage changes in said junction;

and the output electrode of said fourth transistor being connected to the base electrode of said first transistor.

4. An electrical circuit as claimed in claim 3, wherein said impedance includes means for decoupling said feedback circuit to A.C. signals.

5. An electrical circuit for coupling a gyrator circuit to a voltage source having first and second terminals, said gyrator circuit having input, output and first and second terminals and a capacitor connected between said output terminal and the second terminal of said gyrator, whereby an inductive reactance is simulated between said input terminal and said second terminal of said gyrator; said electrical circuit comprising:

first and second transistors of complementary types and each having an emitter, a base and a collector;

the emitter-collector circuit of said first transistor being connected between the first terminal of said source and the first terminal of said gyrator forming a first circuit junction;

the emitter-collector circuit of said second transistor being connected between the second terminal of said source and the second terminal of said gyrator forming a second circuit junction;

the emitter-collector circuits of said first and second transistors providing a high impedance path between said gyrator circuit and said source whereby the input, the output and the first and the second terminals of said gyrator are isolated from the first and second terminals of said voltage source;

means for supplying to the base of said second transistor a substantially constant current;

a negative feedback circuit including a third transistor, having a control electrode and output electrodes, and a fourth transistor, having an input electrode, an output electrode and a common electrode;

the control electrode of said third transistor being connected directly to said first junction for sensing voltage changes thereat, one of the output electrodes of said third transistor being connected to a first impedance;

the input electrode of said fourth transistor being connected to the junction of the output electrode of said third transistor and said first impedance for sensing voltage changes thereat;

and the output electrode of said fourth transistor being connected to the base of said first transistor to supply current to said base whereby the impedance of the emitter-collector circuit of said first transistor is varied inversely with the current requirements of said gyrator circuit, and the voltage between said first and said second terminals of said gyrator is maintained substantially constant.

6. An electrical circuit as claimed in claim 5, wherein said first impedance includes means for decoupling said feedback circuit to A.C. signals.

7. An electrical circuit as claimed in claim 5, further including means connected between the first and the second terminals of the gyrator for providing a low impedance therebetween.

References Cited

UNITED STATES PATENTS

| | | |
|---|---|---|
| 3,056,915 | 10/1962 | Meewezen. |
| 3,284,692 | 11/1966 | Gautherin. |
| 3,340,404 | 9/1967 | Willems et al. |

HERMANN KARL SAALBACH, *Primary Examiner.*

PAUL GENSLER, *Assistant Examiner.*